P. ELY.
Apparatus for Elevating and Moving Grain.
No. 223,036. Patented Dec. 30, 1879.
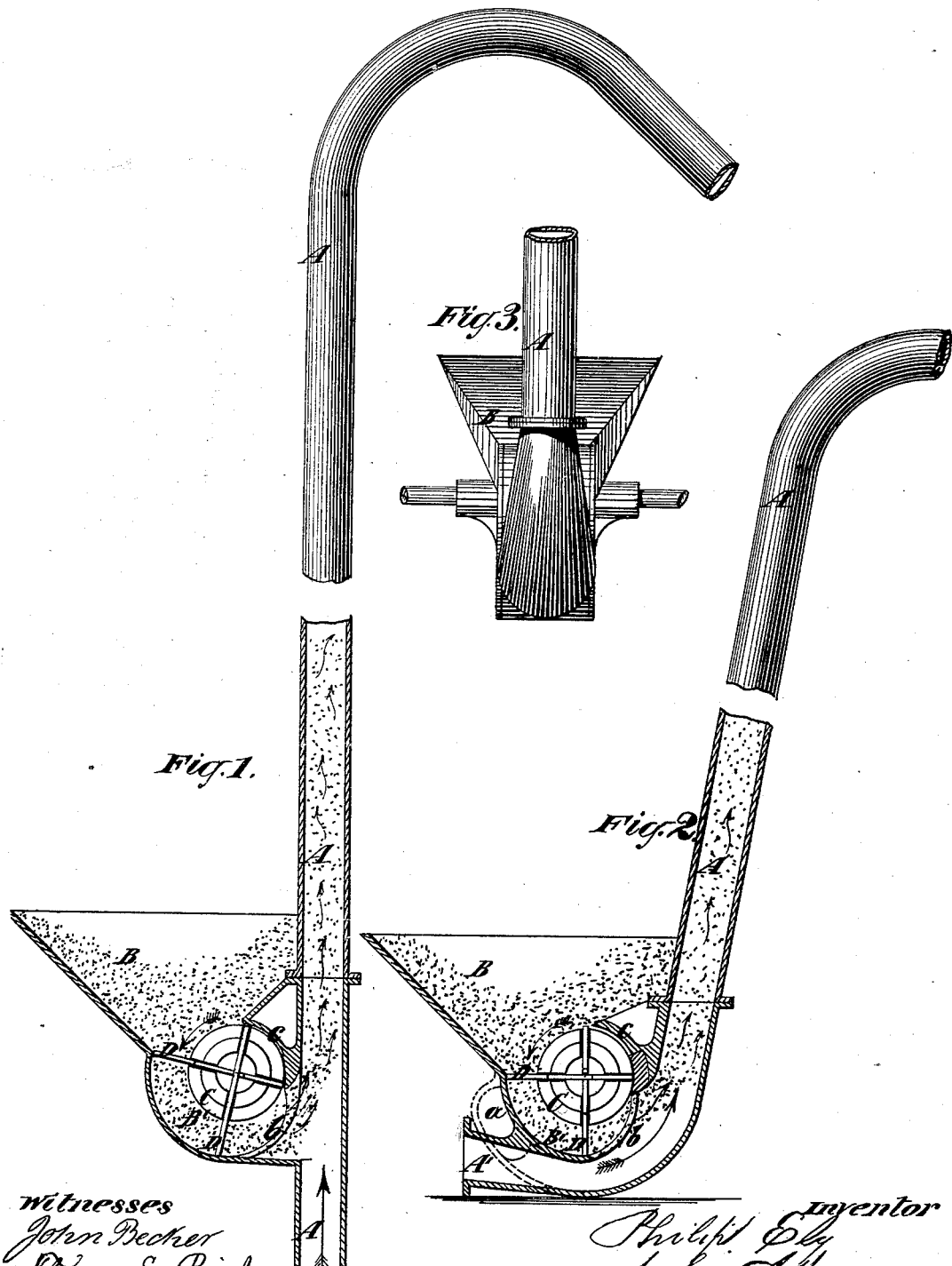

UNITED STATES PATENT OFFICE.

PHILIP ELY, OF NEW YORK, ASSIGNOR OF ONE-HALF OF HIS RIGHT TO JAMES CLAYTON, OF BROOKLYN, N. Y.

IMPROVEMENT IN APPARATUS FOR ELEVATING AND MOVING GRAIN.

Specification forming part of Letters Patent No. 223,036, dated December 30, 1879; application filed October 4, 1879.

*To all whom it may concern:*

Be it known that I, PHILIP ELY, of New York, in the county and State of New York, have invented certain new and useful Improvements in Apparatus for Elevating and Moving Grain, of which the following is a specification.

My invention relates to apparatus in which a current of air is employed as a means for elevating or moving grain or other granular substances; and the object of my invention is to provide for feeding or supplying the grain or other substance to the air-pipe at a uniform rate, and to prevent the grain or other substance from becoming clogged in the air-pipe, or before it enters the same.

To this end my invention consists in the combination, with a pipe or passage, through which may be forced a current of air, and a hopper or receptacle for grain or other substance communicating therewith, of a rotary feeder arranged in the passage between the said hopper and the air-pipe, and consisting of a fan provided with blades or wings, which stir the grain or other substance and carry it gradually to the said air pipe or passage.

It also consists in the combination, with such a hopper or receptacle and air pipe or passage, of a feeder, consisting of a rotary drum or cylinder and movable blades, which are pushed outward as the cylinder or drum revolves and carry the grain or other substance forward with a uniform and positive feed.

In the accompanying drawings, Figure 1 represents a vertical section of an apparatus for elevating grain embodying my invention. Fig. 2 represents a corresponding section of an apparatus of slightly-modified form, and Fig. 3 represents an end elevation of such apparatus.

Similar letters of reference designate corresponding parts in all the figures.

A designates a pipe or passage, through which may pass a current of compressed air, which may be supplied from any outside source. The said pipe or passage is here represented as approximately vertical for elevating grain from the hold of a vessel or in a warehouse; but when the grain or other substance is to be moved from place to place the pipe or passage A might be arranged horizontally or at an incline.

The air might be supplied to the pipe A from below, as represented in Fig. 1, from a horizontal nozzle, A', as shown in Fig. 2; or, if desirable, the nozzle might be formed as represented in dotted outline in Fig. 2, and the air introduced through an opening, $a$, in the side thereof.

B designates a hopper or receptacle for the grain or other substance, and B' designates a passage leading from the said hopper to the pipe or passage A, through which the grain or other substance is delivered from the said hopper.

In order to prevent the grain from becoming clogged in the passage B', and to feed it uniformly forward to the pipe or passage A, I have represented a rotary feeder or stirrer arranged in a casing at the side of the passage B', and consisting of a drum or cylinder, C, from which extend a series of radial blades or wings, D, which enter the grain or other substance and move it gradually and positively along toward the pipe or passage A.

The blades or wings D are, preferably, movable in grooves or slots in the drum or cylinder C. In such case the said drum or cylinder is arranged at one side of the casing, and as it revolves the blades or wings D are moved longitudinally through the drum or cylinder by the cam $b$ and the contiguous portion $c$ of the hopper or receptacle B, so that the opposite ends of the blades or wings enter the grain or other substance and move it forward.

By this construction not only is the grain or other substance stirred or agitated so as to enable it to pass forward to the air pipe or passage without clogging, but it is moved forward by the movable blades or wings with a gradual and positive feed.

What I claim as my invention, and desire to secure by Letters Patent, is—

1. The combination, with a pipe or passage, through which may be forced a current of air, and a hopper or receptacle for grain or other substance communicating therewith, of a rotary feeder, arranged in the passage between the said hopper and air pipe or passage, and consisting of a fan provided with wings or blades, which stir the grain or other substance and move it gradually forward to the said air pipe or passage, substantially as and for the purpose specified.

2. The combination of the air-pipe A, the hopper B, the drum C, the sliding blades or wings D, and the cam $b$, the whole arranged and operating substantially as and for the purpose herein specified.

<div style="text-align:right">PHILIP ELY.</div>

Witnesses:
FREDK. HAYNES,
T. J. KEANE.